(12) United States Patent  
Singh et al.

(10) Patent No.: US 9,183,282 B2  
(45) Date of Patent: Nov. 10, 2015

(54) METHODS AND SYSTEMS FOR INFERRING USER ATTRIBUTES IN A SOCIAL NETWORKING SYSTEM

(71) Applicant: FACEBOOK, INC., Menlo Park, CA (US)

(72) Inventors: Mitu Singh, San Carlos, CA (US); Philip Bohannon, Cupertino, CA (US); Jonathan Chang, San Francisco, CA (US); Ismail Onur Filiz, El Cerrito, CA (US); Tudor Andrei Alexandrescu, Houston, TX (US); Cameron Marlow, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 236 days.

(21) Appl. No.: 13/839,851

(22) Filed: Mar. 15, 2013

(65) Prior Publication Data

US 2014/0279722 A1 Sep. 18, 2014

(51) Int. Cl.
*G06N 99/00* (2010.01)
*G06F 17/00* (2006.01)
*G06F 17/30* (2006.01)
*G06N 5/02* (2006.01)
*G06N 5/04* (2006.01)

(52) U.S. Cl.
CPC .... *G06F 17/30702* (2013.01); *G06F 17/30867* (2013.01); *G06N 5/022* (2013.01); *G06N 5/043* (2013.01)

(58) Field of Classification Search
None
See application file for complete search history.

(56) References Cited

U.S. PATENT DOCUMENTS

2013/0114864 A1* 5/2013 Garcia et al. ................ 382/118
2013/0218965 A1* 8/2013 Abrol et al. ................. 709/204
2013/0268373 A1* 10/2013 Grishaver ................. 705/14.67

OTHER PUBLICATIONS

He, "Missing Data Imputation for Tree-Based Models", thesis, Chapters 1-5, 2006, pp. 53.*
Logistic regression, https://web.archive.org/web/20121214133645/http://en.wikipedia.org/wiki/Logistic_regression, 2012, pp. 21.*

* cited by examiner

*Primary Examiner* — Li-Wu Chang (74) *Attorney, Agent, or Firm* — Nicholson de Vos Webster & Elliott LLP (57) ABSTRACT

A method and system for inferring user attributes in a social networking system. The method includes maintaining a social graph comprising a plurality of nodes and a plurality of edges between the nodes. An unknown, incomplete, or inaccurate user attribute for a user is identified, and a plurality of probability lists are generated using a corresponding plurality of probability algorithms that utilize known user attributes and the social graph. The probability lists include a set of probability entries, each including a prediction value for the unknown, incomplete, or inaccurate user attribute and a confidence score. Using the probability lists and a plurality of weights corresponding to the probability algorithms, an inferred user attribute value is generated and stored. The weights may be adjusted based upon learning the correct value of the unknown, incomplete, or inaccurate user attribute, and search results may be modified to include the user for search queries seeking information about the inferred user attribute.

20 Claims, 8 Drawing Sheets

METHODS AND SYSTEMS FOR INFERRING USER ATTRIBUTES IN A SOCIAL NETWORKING SYSTEM

FIELD

Embodiments of the invention relate to social networking; and more specifically, to inferring user attributes in a social networking system.

BACKGROUND

The usefulness and longevity of a social networking system depends upon both the quantity and quality of user information available on the system. If either the quantity or quality of such content suffers, the system will similarly suffer as users will become frustrated or disengaged.

One such content problem results when user profiles have missing, incomplete, or inaccurate user attribute information, such as a user's city of residence or school affiliation. Without such information, it becomes increasingly difficult for users to locate friends or contacts on the social network using search functionalities, and the social networking system is less able to make contact suggestions or provide user-customized information to its user base.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, the term "module" is used throughout the description and may refer to a hardware circuit or software stored in memory to be run on one or more processors. It should be noted that one or more modules may be combined or have their functionality further broken down. Moreover, the terms "user attribute" and "user attribute value" are used herein to refer to the same feature unless specifically indicated otherwise.

Attributes associated with an entity (user or concept) may be categorical (such as, and not limited to, gender, city of residence, marital status, eye color, etc.), numeric (such as, and not limited to, height, weight, date of birth, current latitude and longitude, etc.), or structured (such as, and not limited to, family relationships, genealogical tree, preferences, etc.).

Detailed below are embodiments of methods, systems, and apparatuses for inferring unknown, incomplete, or inaccurate user attributes of users in a social networking system. For example, the social networking system may know a user's country, but not city; city, but not neighborhood or zip code; age group, but not age; etc. In social networking systems, a user profile may contain an unknown, incomplete, or inaccurate user attribute that may be inferred by using one or more known profile data and aspects of a social graph maintained by the social networking system. These aspects may include the user profile data from user nodes connected to a user node that represents the user, information from concept nodes connected to the user node, and information from second-, third-, and higher degree nodes indirectly connected to the user node. Using this data, each of a plurality of prediction modules generates a probability list including prediction values and corresponding confidence scores. The plurality of probability lists may be combined and weighted to generate an inferred user attribute, which may be stored in a data store, presented to a user in an effort to seek confirmation that it is correct, or used to improve search results in the social networking system. Such analysis and inference, however, is subject to privacy settings of the involved users and the privacy policy of the social networking system.

A social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system. For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user. A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user "likes" a celebrity, etc.). For example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. Other possible definitions may include traversal costs for edges to define separation as the path of minimum cumulative cost between nodes. A degree of separation between two nodes can be considered a measure of relatedness between the entities (users or concepts) represented by the two nodes in the social graph.

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 1:
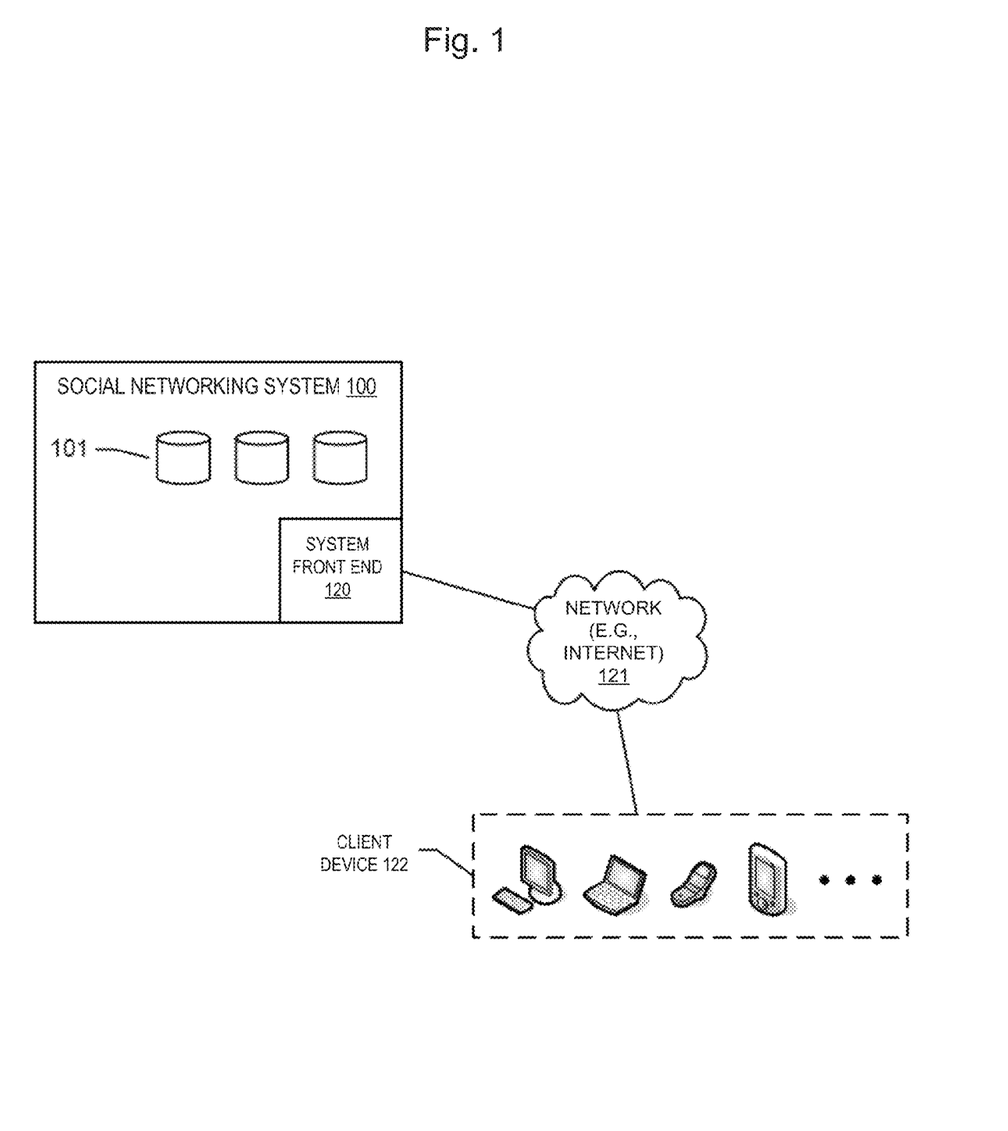
FIG. 1 is an example network environment of a social networking system according to an embodiment of the invention.

FIG. 1 illustrates an example network environment of a social networking system. In particular embodiments, a social networking system 100 may comprise one or more data stores 101. For example, each data store 101 may comprise one or more mass storage devices. In particular embodiments, the social networking system 100 may store in data stores 101 a social graph comprising user nodes, concept nodes, and edges between nodes as described above. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social networking system 100 may comprise one or more computing devices (e.g., servers) hosting functionality directed to operation of the social networking system. In particular embodiments, one or more of data stores 101 may be operably connected to the social networking system's front end 120. A user of the social networking system 100 may access the social networking system 100 using a client device such as client device 122. In particular embodiments, front end 120 may interact with client device 122 through network 121. For example, front end 120 may be implemented in software programs hosted by one or more computing devices of the social networking system 100. Front end 120 may include Hypertext Transfer Protocol (HTTP) server functionality, as well as other functionality, to allow users to access the social networking system 100. Client device 122 may be a desktop computer, laptop computer, tablet computer, personal digital assistant (PDA), in- or out-of-car navigation system, smart phone or other cellular or mobile phone, or mobile gaming device, among other suitable computing devices.

Client device 122 may execute one or more client applications, such as a web browser (e.g., Microsoft Windows Internet Explorer, Mozilla Firefox, Apple Safari, Google Chrome, Opera, etc.) or special-purpose client application (e.g., Facebook for iPhone or iPad, etc.), to access and view content over a computer network 121.

Network 121 may represent a network or collection of networks—such as the Internet, a corporate intranet, a virtual private network (VPN), a local area network (LAN), a wireless local area network (WLAN), a cellular network, a wide area network (WAN), a metropolitan area network (MAN), or a combination of two or more such networks—over which client devices 122 may access the social network system 100.

In particular embodiments, the social networking system 100 may store in data stores 101 data associated with applications and services provided by the social networking system 100. In particular embodiments, the social networking system 100 may store user event data in data stores 101. For example, a user may register a new event by accessing a client application to define an event name, a time and a location, and cause the newly created event to be stored (e.g., as a concept node) in data stores 101. For example, a user may register with an existing event by accessing a client application to confirming attending the event, and cause the confirmation to be stored in data stores 101. For example, the social networking system 100 may store the confirmation by creating an edge in a social graph between a user node corresponding to the user and a concept node corresponding to the event, and store the edge in data stores 101.

Figure 2:
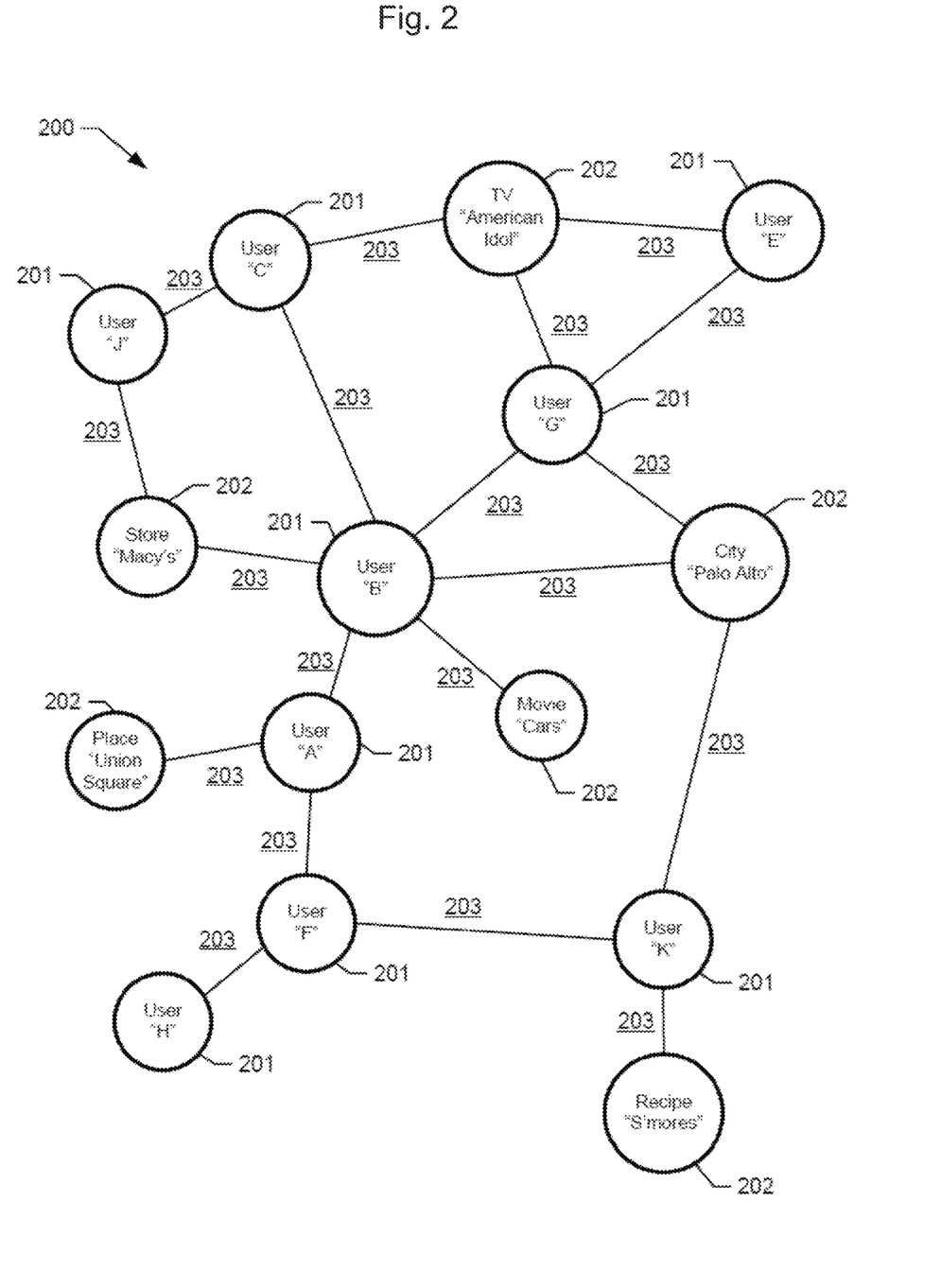
FIG. 2 is a diagram of an example social graph according to an embodiment of the invention.

FIG. 2 illustrates an example social graph 200. In the example of FIG. 2, social graph 200 may include user nodes 201, concept nodes 202, and edges 203 between nodes. An edge 203 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and "G" watch (or "like") TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" likes "Macy's." Of course, social graphs can be much larger than social graph 200 illustrated in FIG. 2, and the number of edges and/or nodes in a social graph may be many orders of magnitude larger than that depicted herein.

As described above, an edge between a pair of nodes may indicate a direct relationship between the pair of nodes. More generally, an edge may encode a similarity (factual or hypothesized similarity or affinity between two nodes. An edge may be directed and connect an ordered pair of nodes. For example, an edge connecting a user node corresponding to a user and a concept node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. It is also desirable to determine a likelihood of a relationship or an interest between a pair of nodes that are two or more hops away. For example, the social networking system 100 may provide (e.g., via an email or a wall-post) a recommendation (e.g., an advertisement) for "Macy's" to user "B", given the direct relationship represented by the edge between the user node "B" and the concept node "Macy's" as illustrated in FIG. 2. The social networking system 100 may also provide a recommendation for "Macy's" to first-degree friends of user "B" (e.g., users "C", "G", "A") as first-degree friends often share comment interests. Meanwhile, it is also desirable to estimate whether users that are further away from user "B" in degrees of separation (e.g., users "E", "F", "H") may also be interested in "Macy's" (and interested in receiving recommendations for "Macy's"). As yet for another example, user "B" may have "Palo Alto" as their city of residence, as illustrated in FIG. 2 by the edges between the concept node "Palo Alto" and the user nodes "B." Although it is common that first-degree friends of user "B" (e.g., "G") live in the same city as user "B", it is desirable to determine the likelihood that those first degree friends and other users who are further away from user "B" in degrees of separation (e.g., users "J", "F", "H") may live in the city of "Palo Alto", since one or more of those users may not have declared a city of residence, or may have moved out of "Palo Alto" but have not updated the change in the social networking system 100. Numeric attributes (height, age/date of birth, etc.) or structured attributes (family relations, preferences, etc.) are usually not represented by conceptual nodes in the social graph.

Figure 3:
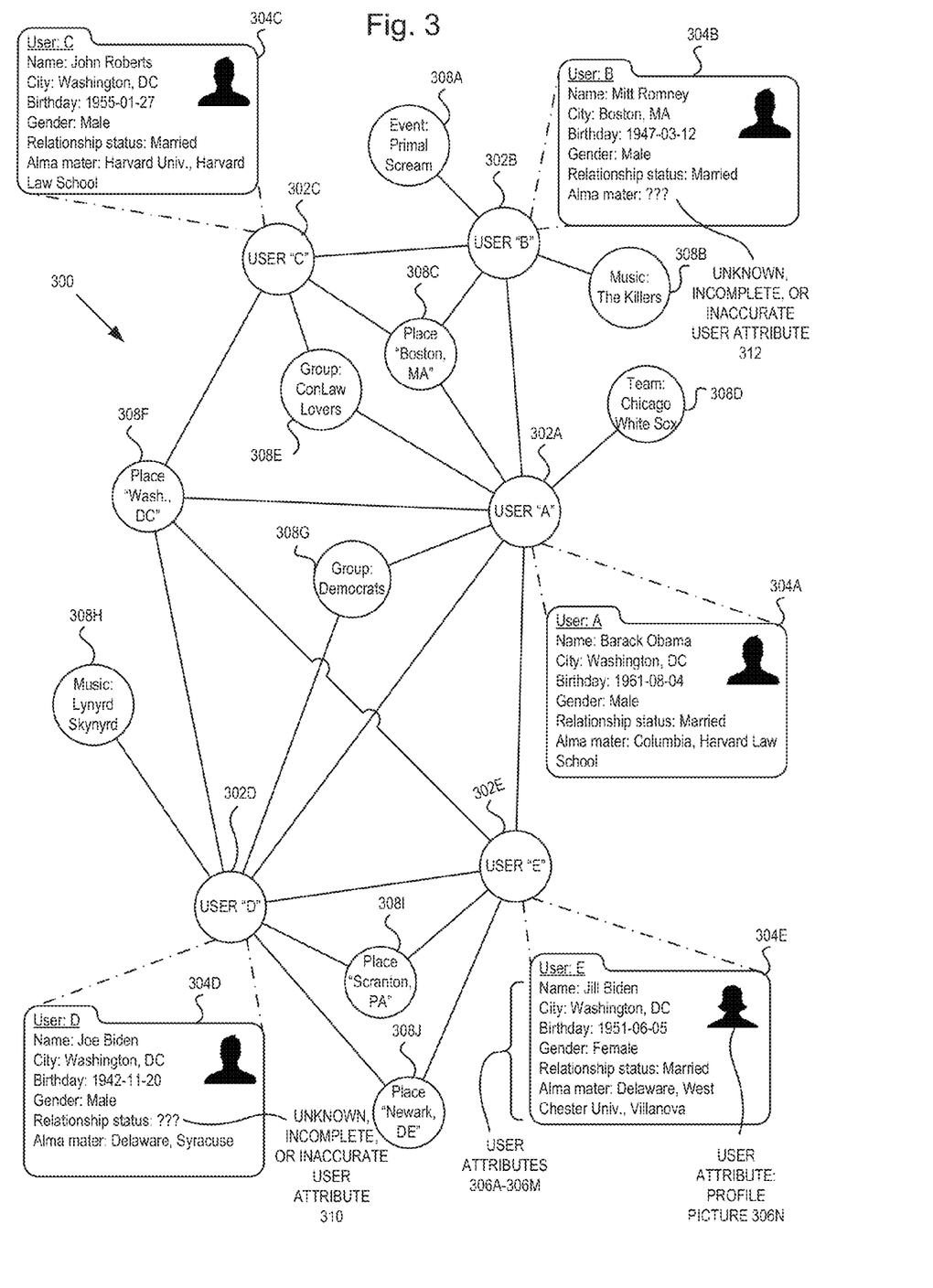
FIG. 3 is a diagram illustrating one example of a social graph in a social networking system including user profiles, user attributes, and unknown, incomplete, or inaccurate user attributes according to an embodiment of the invention.

FIG. 3 is a diagram illustrating one example of a social graph in a social networking system including user profiles, user attributes, and unknown, incomplete, or inaccurate user attributes according to an embodiment of the invention. Similar to FIG. 2, FIG. 3 illustrates a social graph 300 including edges connecting user nodes 302A-302E and concept nodes 308A-308J. FIG. 3 also illustrates user profile data 304A-304E for each user node 302A-302E that comprises a plurality of user attributes (e.g., 306A-306N). For example, a user node 302E for a user "E" includes user profile data 304E including user attribute values 306A-306M for the user's name, city of residence, birthday, gender, relationship status, and alma mater (i.e., schools, universities, and/or colleges where the user has studied). Additionally, the user profile data 304E also includes a profile picture user attribute 306N. In some embodiments, the user profile data (e.g., 304E) is stored within a data structure representing a user node (e.g. 302E), but in other embodiments the user profile data is stored as a separate data structure but associated with the user node through one or more identifiers or pointers.

In the depicted embodiment of FIG. 3, many user attribute values (e.g., "city" or "alma mater") are included within the user profile data 304A-304E, but these may or may not have an associated concept node representation. In different embodiments, however, some, none, or all of the user attribute values may have a representation in the social graph 300 as a concept node. For example, the user profile data 304E for user node 'E' 302E includes a "City" user attribute value of "Washington, D.C.", which is also represented in the social graph 300 as a concept node 308F for "Place: Washington, D.C.". However, the user profile data 304E for user node 'E' 302E also includes several user attribute values for "Alma mater" that are not represented as concept nodes—Delaware, West Chester University, and Villanova. However, in some embodiments these user attribute values are represented by concept nodes in the social graph 300. In some embodiments, the user attributes 306A-306M are not stored as a literal user profile data record, but may be represented by using concept nodes and labeled edges connecting a user and a particular concept node. In such an embodiment, a value for "Washington, D.C." is not stored separately for user 'E' 302E, but instead the edge connecting user node 'E' 302E and "Place: Washington, D.C." is labeled as "City".

FIG. 3 also depicts unknown, incomplete, or inaccurate user attributes. For example, the user profile data 304B associated with user node 'B' 302B has an unknown, incomplete, or inaccurate user attribute 312 for "Alma mater". Similarly, the user profile data 304D associated with user node 'D' 302D has an unknown, incomplete, or inaccurate user attribute 310 for "Relationship status". With the existence of such unknown, incomplete, or inaccurate user attributes (310, 312), the usefulness of the social networking system 100 for its users is degraded. For example, if a former classmate of user 'B' attempts to find former classmates by performing a search for others graduating from a particular university, the search will be incomplete and not return user 'B' because the social networking system 100 does not know that user 'B' studied at that school. Thus, instead of being able to return a full set of users of the social networking system 100 that attended that school, only a subset of those attendees are able to be returned. This eliminates an opportunity for social connections to be made and the interconnectedness of the users of the social networking system 100 to be strengthened. Additionally, without complete user profile data, the social networking system 100 is unable to provide more tailored, individualized services to its users. For example, if the user profile data for a user is missing a user attribute value for "city", the social networking system 100 is unable to recommend interesting social events occurring in that city to the user.

Embodiments of the invention address the problem of unknown, incomplete, or inaccurate user attributes by inferring unknown, incomplete, or inaccurate user attributes by analyzing user profile data and/or data from the social graph 300. Certain of these embodiments infer an unknown, incomplete, or inaccurate user attribute by examining other known user attributes for that user and detecting trends across the entire social networking system 100 in how such user attributes may indicate the correct value of other unknown, incomplete, or inaccurate user attributes. Further, certain embodiments examine both user profile data as well as the set of directly- and possibly indirectly-connected concept nodes and/or user nodes (from the perspective of the user with the unknown, incomplete, or inaccurate user attribute value) from the social graph to predict the value of the unknown, incomplete, or inaccurate user attribute. In some embodiments, the social networking system 100 may predict unknown, incomplete, or inaccurate user attributes by analyzing that user's profile data, the set of nodes connected to the user node of the user (e.g., "friend" nodes), and the user profile data and connected nodes for those friend nodes. Moreover, certain embodiments utilize many different combinations of the above data within a plurality of prediction modules to generate a plurality of predictions, and these multiple predictions are analyzed together to infer the unknown, incomplete, or inaccurate user attribute. In an embodiment, one or more of the plurality of prediction modules are also configured to generate predictions through machine learning techniques utilizing "global" data from throughout the social graph 300, not just from the user and/or closely-connected users (including but not limited to first-degree nodes, second-degree nodes, et seq.). In an example embodiment, one of the prediction modules generates a first probability list using information from many nodes of the social graph 300. In an embodiment, the one prediction module utilizes this generated first probability list, along with other known information, to generate a second probability list. Thus, the one prediction module, in an embodiment, is configured to generate predictions by iteratively generating probability lists based upon previously generated "transient" probability lists.

Figure 4:
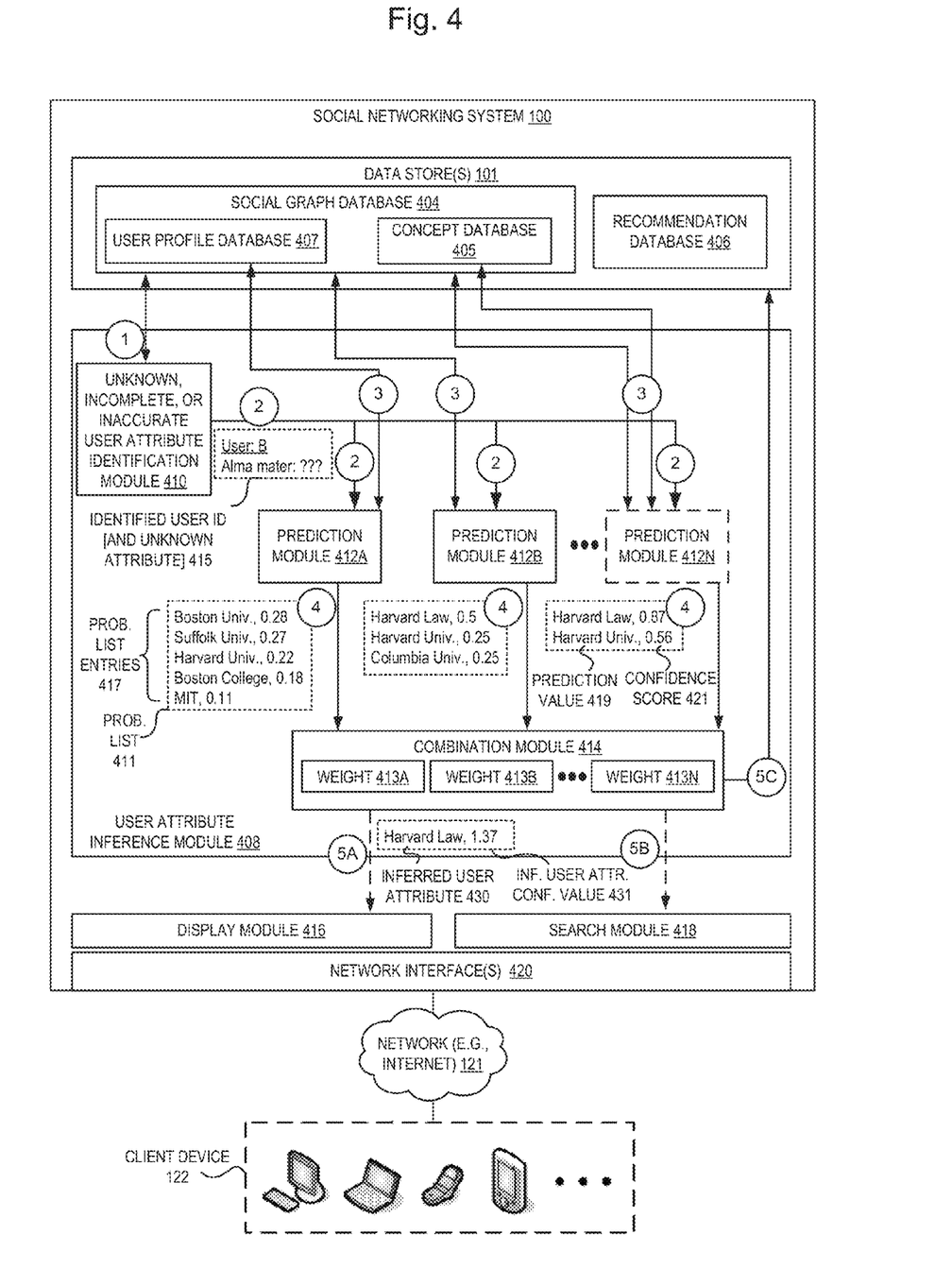
FIG. 4 illustrates a block diagram of a social networking system configured to infer unknown, incomplete, or inaccurate user attributes for the social graph of FIG. 3 using a plurality of prediction modules according to an embodiment of the invention.

FIG. 4 illustrates a block diagram of a social networking system configured to infer unknown, incomplete, or inaccurate user attributes for the social graph of FIG. 3 using a plurality of prediction modules according to an embodiment of the invention. FIG. 4 illustrates, according to one embodiments of the invention, the use of the components of the social networking system 100 to infer an unknown, incomplete, or inaccurate user attribute 312 for user 'B' (see user node 302B, user profile data 304B) of FIG. 3. However, as described above, all inference and analysis performed by the social networking system 100 is subject to and restricted by each user's privacy settings.

FIG. 4 includes the social networking system 100, which may comprise one or more computing devices, being communicatively coupled through a set of one or more physical network interfaces 420 to a client device 122 through a network 121. The social networking system 100 includes a user attribute inference module 408 providing an unknown, incomplete, or inaccurate user attribute identification module 410, a plurality of prediction modules 412A-412N, and a combination module 414, all of which are useful in inferring unknown, incomplete, or inaccurate user attributes.

At circle '1', the unknown, incomplete, or inaccurate user attribute identification module 410 utilizes the social graph database 404 of the data stores 101 to determine an unknown, incomplete, or inaccurate user attribute for a particular user that should be inferred. In an embodiment, this procedure includes an administrator or operator of the social networking system 100 stipulating a particular user attribute that should be inferred for one or more users that have not provided a value for that user attribute. Then, the unknown, incomplete, or inaccurate user attribute identification module 410 scans the social graph database 404 (and, in particular, the user profile database 407) to identify the users without a value for the user attribute. In the depicted example of FIG. 4, for example, an administrator may have entered a command instructing the user attribute inference module 408 to infer attribute values for those users without an "alma mater" entered. At circle '2', one such user has been detected—user 'B' from FIG. 3—and information identifying the user 415 (and optionally, identifying the particular user attribute) is sent from the unknown, incomplete, or inaccurate user attribute identification module 410 to a plurality of prediction modules 412A-412N. In this example and in others throughout this description, the value "N" used within the reference numeral 412N is a placeholder representing an arbitrary number—thus, in the depicted example, there could be 2, 3, 4, or any larger number of prediction modules.

Each prediction module 412A-412N is configured to use a different prediction algorithm to generate a set of one or more possible prediction values within a list of probabilities. In an embodiment, each prediction value in the list has a corresponding confidence score that indicates a predicted likelihood that the corresponding prediction value is the correct value of the unknown, incomplete, or inaccurate user attribute. While in some embodiments, the sum of the confidence scores 421 in a list 411 equals one, in other embodiments there is no such requirement. Thus, the prediction modules 412A-412N at circle '3' access one or more portions of the social graph database 404 to retrieve data necessary for their decision making processes. In other embodiments, the prediction modules 412A-412N do not access the social graph database 404, but instead have all necessary data provided by the unknown, incomplete, or inaccurate user attribute identification module 410 at circle '2'.

In an embodiment of the invention, each prediction algorithm utilizes different information from the data store 101 to generate its predictions in the form of probability list entries 417 within probability lists 411. For example, the first prediction module 412A is illustrated at circle '3' as accessing the user profile database 407 of the social graph database 404. In this depicted embodiment, the first prediction module 412A is configured to access only user profile database 407 to examine the user profile data (i.e. known user attributes) of user 'B'. For example, in an embodiment the first prediction module 412A may be configured to examine the "city" user attribute of the user profile 304B—here, containing "Boston, Mass."—and generate probability list entries 417 according to that piece of information. In the depicted embodiment, for example, the first prediction module 412A generates a probability list 411 including a particular top number of schools (as prediction values 419) attended by all users in the social networking system 100 that list a "city" user profile attribute of "Boston, Mass.", with corresponding confidence scores 421 based upon the percentage of those users that went to those schools. Accordingly, in the depicted embodiment at circle '4', the first prediction module 412A generates a probability list 411 including five probability list entries 417, which represent the top five schools attended by users of the social networking system 100 with "Boston, Mass." as their user attribute value for "city".

As described above, each prediction module 412A-412N is configured to use different data from the data store 101 and/or a different algorithm to generate the probability list 411. The second prediction module 412B is depicted, at circle '3', as accessing the social graph database 404. In this embodiment, the second prediction module 412B utilizes an algorithm based upon the user profile data from each user node that user 'B' is directly connected to (i.e. those user nodes one hop away). For example, in the depicted embodiment, user node 'B' 302B is directly connected to user nodes 'A' 302A and 'C' 302C, which include the "alma mater" values of Harvard University, Harvard Law School, Columbia University, and Harvard Law School (again). Thus, in the depicted embodiment, the algorithm of the second prediction module 412B uses this data to generate a probability list at circle '4' including these three schools, with a higher confidence score assigned to Harvard Law School because it appeared more frequently in the user profiles of the directly-connected user nodes.

The third prediction module 412N (which, as described above, may be a third, fourth, or larger prediction module) is illustrated at circle '3' as employing an algorithm that utilizes data directly from the concept database 405 (storing information about concept nodes) as well as the social graph database 404. For example, in the depicted embodiment, the algorithm examines the alma mater user attributes of directly connected user nodes (similar to the algorithm for the second prediction module 412B) but augments the results using information about the concept nodes that are directly-connected to user node 'B' 304B. In this example, the third prediction module 412N initially generates a similar probability list 411 to that generated by the second prediction module 412B; however, after examining the directly-connected concept nodes for "Primal Scream" 308A (an "event" at Harvard—the concept node is "liked" by many users with an "alma mater" user attribute of Harvard University and Harvard Law) and for the place "Boston, Mass." 308C, the algorithm reduces the probability list 411 to include two probability list entries 417: one with a prediction value 419 of Harvard Law School and one with a prediction value 419 of Harvard University.

In some embodiments, a prediction module employs an algorithm that utilizes information from a plurality of nodes of the social graph database 404 that represent users or concepts that are not directly or closely-connected to the user. In some embodiments, the algorithm utilizes information from a plurality of nodes that are not even connected to the user whatsoever. Further, in some embodiments, a prediction module employs an algorithm that iteratively generates one or more "transient" probability lists in order to ultimately generate and output a final probability list 411. In each such iteration, the prediction module may add or remove probability list entries 417 from a recently-generated probability list and/or may modify the confidence scores 421 associated with each prediction value 419 of the recently-generated probability list to ultimately generate a new probability list. In various embodiments, the prediction module uses one or more such iterations to ultimately generate a "final" probably list 411.

While the above-described outlines for prediction module 412A-412N algorithms are useful, many useful algorithms exist for different social networking system 100 implementations and for inferring different unknown, incomplete, or inaccurate user attribute values. Accordingly, such algorithms could utilize one or more of user profile data, directly connected user and/or concept nodes data, user profile data from directly connected user nodes, data from directly connected concept nodes, or any of the above data for second-hop nodes, third-hop nodes, etc. For example, an algorithm may examine those directly connected concept nodes "liked" by a user, and an algorithm may examine those directly connected concept nodes that represent "groups" that the user belongs to. Additionally, in certain embodiments an algorithm may utilize nodes of the social graph that are not closely-connected to the user.

After circle '4', the combination module 414 has received a plurality of different probability lists (e.g. 411) from the plurality of prediction modules 412A-412N. The combination module 414, in an embodiment, utilizes a plurality of weights 413A-413N corresponding to each prediction module 412A-412N to analyze the probability lists and generate an inferred user attribute 430. In an embodiment, at the beginning of use of the system, each weight 413A-413N is the same, and thus the predictions from every prediction module 412A-412N are granted equal weight. In some embodiments, the weights 413A-413N are hand-tuned by an administrator to place a higher reliance upon probability lists from particular prediction modules. However, in some embodiments, a user may at some point enter (or confirm) a correct value for the unknown user value; in this scenario, the combination module 414 may re-examine the probability lists provided when inferring that user attribute and adjust the weights accordingly to give more weight to those prediction modules that did in fact correctly infer the correct user attribute value.

In one embodiment, the confidence score (e.g. 421) from each probability list entry 417 is multiplied by the corresponding weight (e.g. 413N) for the prediction module (e.g. 412N) that generated the probability list. With all confidence scores from all probability lists multiplied accordingly, duplicate prediction values (e.g. 419) from different probability lists are consolidated by adding their confidence scores together. This final list is sorted in descending order according to the composite confidence score, and the prediction value with the highest composite confidence score is selected as the inferred user attribute 430. In the example of FIG. 4, the inferred user attribute 430 is Harvard Law, and the inferred user attribute confidence value 431 (i.e., composite confidence score) is "1.37".

At circle '5A', the inferred user attribute 430 is optionally given to a display module 416, which may create a user interface for the user seeking confirmation that the inferred user attribute 430 is correct. Further, the display module 416 may utilize the inferred user attribute 430 along with the recommendation database 406 to present recommendation messages to the user. In an embodiment, recommendation messages are configured to be displayed to those users having a particular user profile attribute value, and if the inferred user attribute is the same as the particular user profile attribute value, the recommendation message is displayed to the user.

At circle '5B', the inferred user attribute 430 is optionally given to a search module 418, which may allow the user to be included in search results for search queries seeking information about "Harvard" or "Harvard Law", despite these values not being entered into the user's user profile as a user attribute. In an embodiment, the inferred user attribute confidence value 431 is used to determine where in the list of search results the user is to be placed. In an embodiment, the inferred user attribute confidence value 431 must meet or exceed a defined value to allow the user to be included within search results. At circle '5C', the inferred user attribute 430 is sent to the data store 101 for storage. In an embodiment, the inferred user attribute 430 is written to the user profile of the user, but in other embodiments, the inferred user attribute 430 is written to another location outside of the user profile or user profile database 407.

Figure 5:
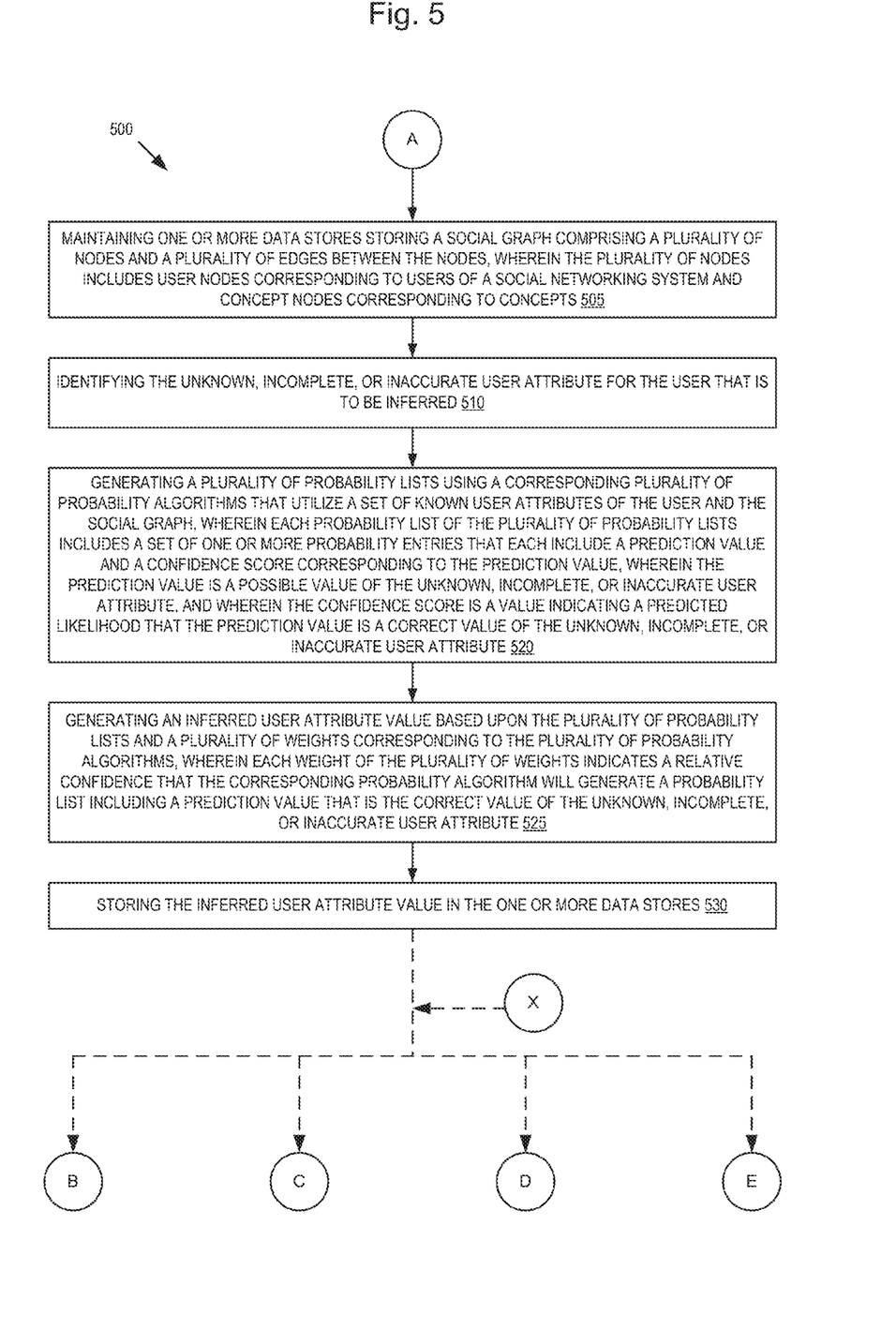
FIG. 5 illustrates a flow for inferring unknown, incomplete, or inaccurate user attributes according to an embodiment of the invention.

FIG. 5 illustrates a flow 500 for inferring unknown, incomplete, or inaccurate user attributes according to an embodiment of the invention. The flow begins at circle 'A', which leads to step 505 where one or more data stores storing a social graph is maintained. The social graph comprises a plurality of nodes and a plurality of edges between these nodes. The plurality of nodes includes at least two different types of nodes: user nodes that correspond to users of a social networking system, and concept nodes that correspond to concepts. As described above, a concept may be nearly any entity, such as a movie, a song, a television show or character, a product, a food, a sports team, a store, a celebrity, a group, a restaurant, a place/location, etc.

At step 510, the social networking system 100 identifies an unknown, incomplete, or inaccurate user attribute for a user that is to be inferred. A user attribute is a data object that describes the user, and can be a node in the social graph of the social networking system, or it can be a string of text including letters, numbers, punctuation, etc. However, an unknown, incomplete, or inaccurate user attribute is a missing user attribute value, perhaps due to the user not entering that data. Unknown, incomplete, or inaccurate user attributes to be inferred may be identified a number ways, including, but not limited to, evaluating a user profile to find entries of that profile that have not been entered, adding a new entry into a user profile that the social network wants filled in, receiving a request for information about a particular user that the user has not identified, etc.

At step 520, the social networking system 100 generates a plurality of probability lists using a corresponding plurality of probability algorithms, which utilize a set of known user attributes of the user and the social graph. Each probability list includes one or more probability entries, each of which includes a prediction value and a confidence score corresponding to the prediction value. The prediction value is a possible value of the unknown, incomplete, or inaccurate user attribute, and the confidence score is a value indicating a predicted likelihood that the prediction value is the correct value of the unknown, incomplete, or inaccurate user attribute.

The social networking system 100 continues at step 525 and generates an inferred user attribute value based upon the plurality of probability lists and a plurality of weights corresponding to the plurality of probability algorithms. Each of the plurality of weights indicates a relative confidence that the corresponding probability algorithm will generate a probability list including a prediction value that is the correct value of the unknown, incomplete, or inaccurate user attribute. At step 530, the social networking system 100 stores the inferred user attribute value in the one or more data stores.

Figure 6:
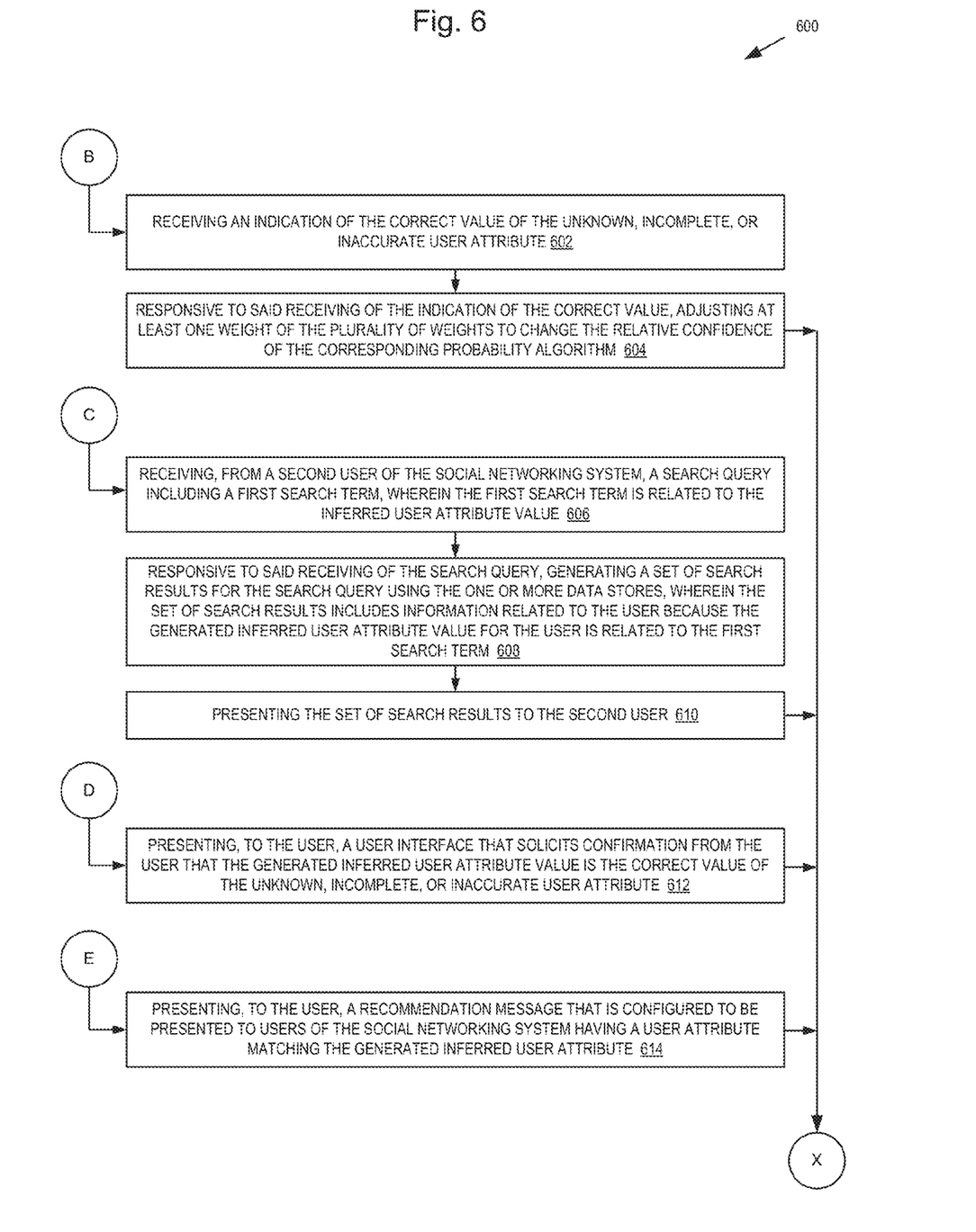
FIG. 6 illustrates a flow including additional steps for inferring unknown, incomplete, or inaccurate user attributes in addition to those of the flow diagram of FIG. 5 according to an embodiment of the invention.

After step 530, the flow may optionally continue by performing an additional step or steps represented by one of circles 'B', 'C', 'D', and 'E'. These additional steps are depicted in FIG. 6. After the performance of one of these additional steps, the flow continues back at circle 'X', and optionally the process may continue again.

FIG. 6 illustrates a flow 600 including the additional steps for inferring unknown, incomplete, or inaccurate user attributes in addition to those of the flow diagram of FIG. 5 according to an embodiment of the invention.

At circle 'B', the flow 600 continues to step 602, where the social networking system 100 receives an indication of the correct value of the unknown, incomplete, or inaccurate user attribute. In an embodiment, this occurs after the social networking system 100 prompts the user to enter information for the unknown, incomplete, or inaccurate user attribute. In an embodiment, the social networking system 100 asks the user if the inferred unknown, incomplete, or inaccurate user attribute is the correct value of the unknown, incomplete, or inaccurate user attribute. At step 604, the social networking system 100, in response receiving the indication of the correct value, adjusts at least one weight of the plurality of weights to change the relative confidence of the corresponding probability algorithm. In an embodiment, if one or more of the prediction algorithms included the correct user attribute value in its probability list, those prediction algorithms may have their weights increased by some amount to increase the method's reliance upon the predictions generated by those algorithms. In an embodiment, weights are only increased for a prediction algorithm if the correct user attribute value was the prediction value in its prediction list having the highest confidence score. At this point, the flow continues to circle 'X', which may terminate the flow or lead to additional optional steps.

At circle 'C', the flow 600 continues to step 606, where the social networking system 100 receives, from a second user of the social networking system 100, a search query. This search query includes a first search term, which is related to the inferred user attribute value. For example, the social networking system 100 may have inferred that a user's alma mater is Stanford University, and the first search term might be "Stanford", "Stanford University", or "Leland Stanford Junior University." At step 608, responsive to said receiving of the search query, the social networking system 100 generates a set of search results for the search query using the one or more data stores. This set of search results includes information related to the user because the generated inferred user attribute value for the user is related to the first search term. Thus, even though the user's profile did not include a value for the alma mater user attribute, the social networking system 100 is still able to include the user in the search results. At step 610, the set of search results are presented to the second user. At this point, the flow continues to circle 'X', which may terminate the flow or lead to additional optional steps.

At circle 'D', the flow 600 continues to step 612, where the social networking system 100 presents, to the user, a user interface that solicits a confirmation from the user that the generated inferred user attribute value is the correct value of the unknown, incomplete, or inaccurate user attribute. In an embodiment, this presentation occurs when the user first logs in to the social networking system 100, but in other embodiments it occurs when the user views his or her user profile page. At this point, the flow continues to circle 'X', which may terminate the flow or lead to additional optional steps.

At circle 'E', the flow 600 continues to step 614, where the social networking system 100 presents, to the user, a recommendation message that is configured to be presented to users of the social networking system 100 having a user attribute matching the generated inferred user attribute. For example, the social networking system 100 may be configured to display to those users having a "city" user attribute value of "San Francisco" a recommendation message, such as "Union Square Ice-Skating Rink, Now Open!" However, the term "recommendation message" is defined herein to mean any audio-visual item (e.g. text, graphic, video, sound, etc., or combination thereof) designed for a particular group of users of the social networking system, and does not need to strictly include a communication that recommends something. Thus, in some embodiments the recommendation message is a paid advertisement. At this point, the flow continues to circle 'X', which may terminate the flow or lead to additional optional steps.

Figure 7:
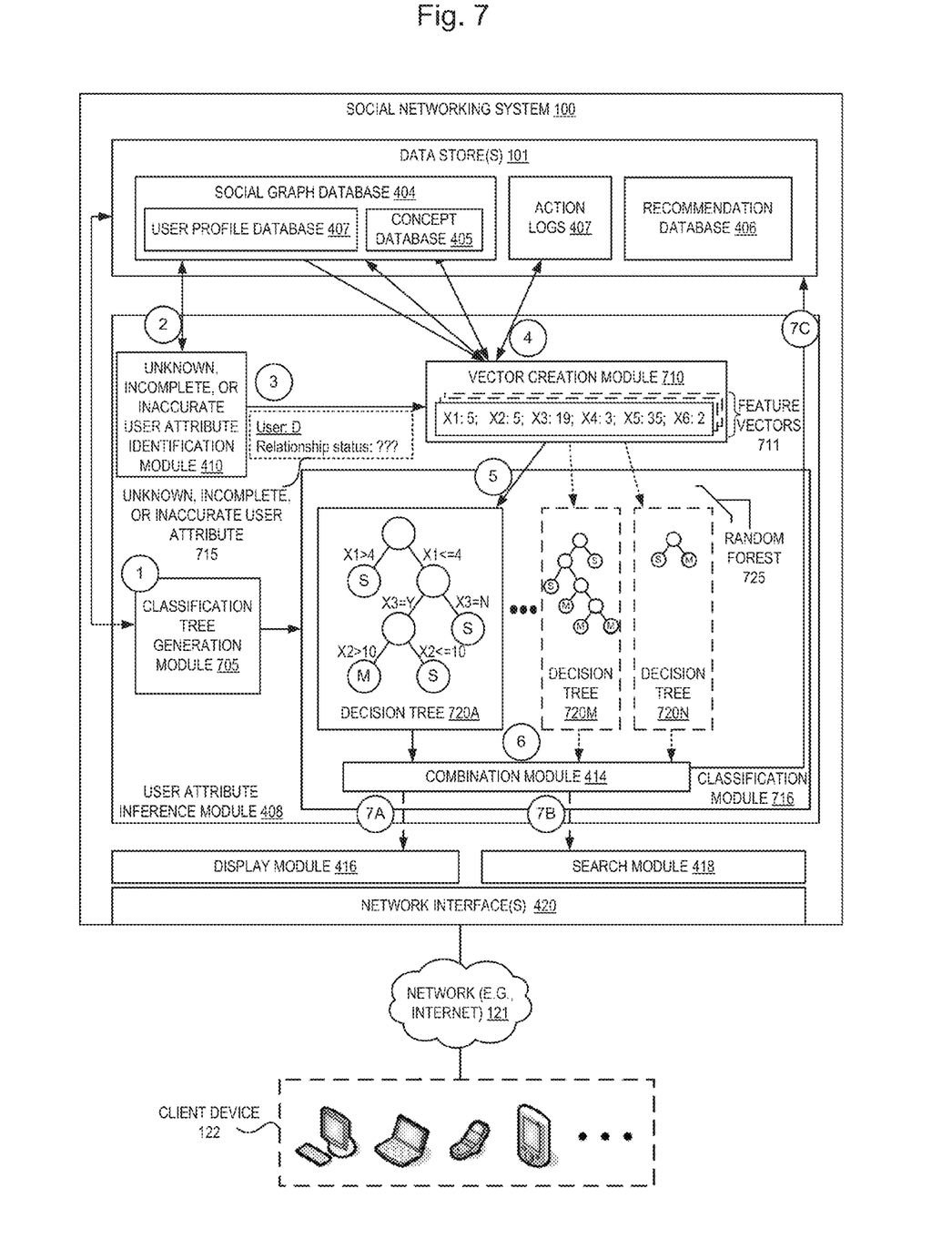
FIG. 7 illustrates a block diagram of a social networking system for inferring user attributes using decision trees according to an embodiment of the invention.

FIG. 7 illustrates a block diagram of a social networking system for inferring user attributes using decision trees according to an embodiment of the invention. While both FIG. 4 and FIG. 7 depict a social networking system 100 configured to infer unknown, incomplete, or inaccurate user attributes, the embodiment of FIG. 7 includes different modules and performs the inference differently than the embodiment disclosed in FIG. 4.

While the depicted embodiment is useful for inferring many different user attribute values, the depicted example of FIG. 7 illustrates inferring an unknown, incomplete, or inaccurate user attribute 310 of relationship status for user 'D' of FIG. 3 for ease of illustration. As described above, all inference and analysis performed by the social networking system 100 is subject to and restricted by each user's privacy settings.

At circle '1', a classification tree generation module 705 of a user attribute inference module 408 generates one or more decision trees 720A-720N. The generation of classification trees (or a random forest 725 ensemble classifier), when given a set of labeled vectors as training data, is not described in detail here to avoid obscuring aspects of the invention. Moreover, in other embodiments of the invention, classifiers other than decision trees are utilized by the classification module 716, including but not limited to binary classifiers, multiclass classifiers, linear classifiers, Naïve Bayesian classifiers, Neural networks, Hidden Markov models, Support Vector Machines, etc. However, in the depicted embodiment, the decision trees 720A-720N are constructed using a plurality of feature vectors created using the social graph database 404 and/or the action logs 407 of the data store 101.

When a user takes an action on the social networking system 100, the action is recorded in the action logs 407. In one embodiment, the system 100 maintains the action logs 407 as a database of entries. When an action is taken on the system 100, therefore, the system 100 adds an entry for that action to the logs 407. In one embodiment, an entry comprises some or all of the following information: Time (a timestamp of when the action occurred), User (an identifier for the user who performed the action), Target (an identifier for the user to whom the action was directed), Action Type (an identifier for the type of action performed), Object (an identifier for an object acted on by the action), and Content (content associated with the action).

For example, the vectors may include a variety of representations of interaction types in the social networking system 100, including but not limited to counts of the number of profile pages viewed, counts of the number of profile pages viewed in a particular age range, counts of the number of profile pages viewed of single/married/relationship users, counts of a number of friend requests sent by the user, counts of a number of friend requests received by the user, a count of the number of friendships (first-degree user nodes) in the system 100, counts of times tagged in a photograph with friends, counts of times tagged in a photograph with non-friends, counts of times tagged in a photograph with multiple single individuals, counts of times tagged in a photograph with multiple married individuals, counts of check-ins at particular locations, counts of messages sent to people of a certain relationship status, etc. These examples are illustrative as potential values to be used in training data vectors used for constructing classification trees, and different numbers or types of values may be used to infer other types of user attributes in different social networking systems 100. Of course, all inference and analysis performed by the social networking system 100 is subject to and restricted by each user's privacy settings.

At circle '2', the unknown, incomplete, or inaccurate user attribute identification module 410 utilizes the social graph database 404 of the data stores 101 to determine an unknown, incomplete, or inaccurate user attribute for a particular user that should be inferred. In an embodiment, this procedure includes an administrator or operator of the social networking system 100 stipulating a particular user attribute that should be inferred for one or more users that have not provided a value for that user attribute. Then, the unknown, incomplete, or inaccurate user attribute identification module 410 scans the social graph database 404 (and, in particular, the user profile database 407) to identify the users without a value for the user attribute. In the depicted example of FIG. 7, at circle '3' the unknown, incomplete, or inaccurate user attribute identification module 410 determines that an unknown, incomplete, or inaccurate user attribute 715 of "relationship status" will be inferred for user node 'D' 304D. At circle '4', the vector creation module 710 creates a set of one or more feature vectors 711 to be sent at circle '5' to the decision trees 720A-720N of the classification module 716 by querying one or more of the social graph database 404, user profile database 407, concept database 405, and action logs 407.

At circle '6', the results from each of the decision trees (which in some embodiments include either a prediction value of 'S' or 'M' indicating single or married, and in some embodiments also include a confidence score for the prediction value) are input into the combination module 414, which determines a final inferred user attribute value. In one embodiment with multiple decision trees 720A-720N in a random forest 725 classifier, the combination module 414 determines the inferred user attribute using a simple raw vote between the decision trees 720A-720N; however, many other combination algorithms exist for this task.

At circle '7A', the inferred user attribute is optionally given to a display module 416, which may create a user interface for the user seeking confirmation that the inferred user attribute 430 is correct. Further, the display module 416 may utilize the inferred user attribute along with the recommendation database 406 to present recommendation messages to the user. In an embodiment, recommendation messages are configured to be displayed to those users having a particular user profile attribute value, and if the inferred user attribute is the same as the particular user profile attribute value, the recommendation message is displayed to the user.

At circle '7B', the inferred user attribute is optionally given to a search module 418, which may allow the user to be included in search results for search queries seeking information about the inferred user attribute value, despite that value not being entered into the user's user profile as a user attribute. In an embodiment, the inferred user attribute confidence value is used to determine where in the list of search results the user is to be placed. At circle '7C', the inferred user attribute is sent to the data store 101 for storage, and may be written to the user profile database 407 (perhaps to the user profile of the user) or another location of the data store 101 outside the user profile database 407.

Figure 8:
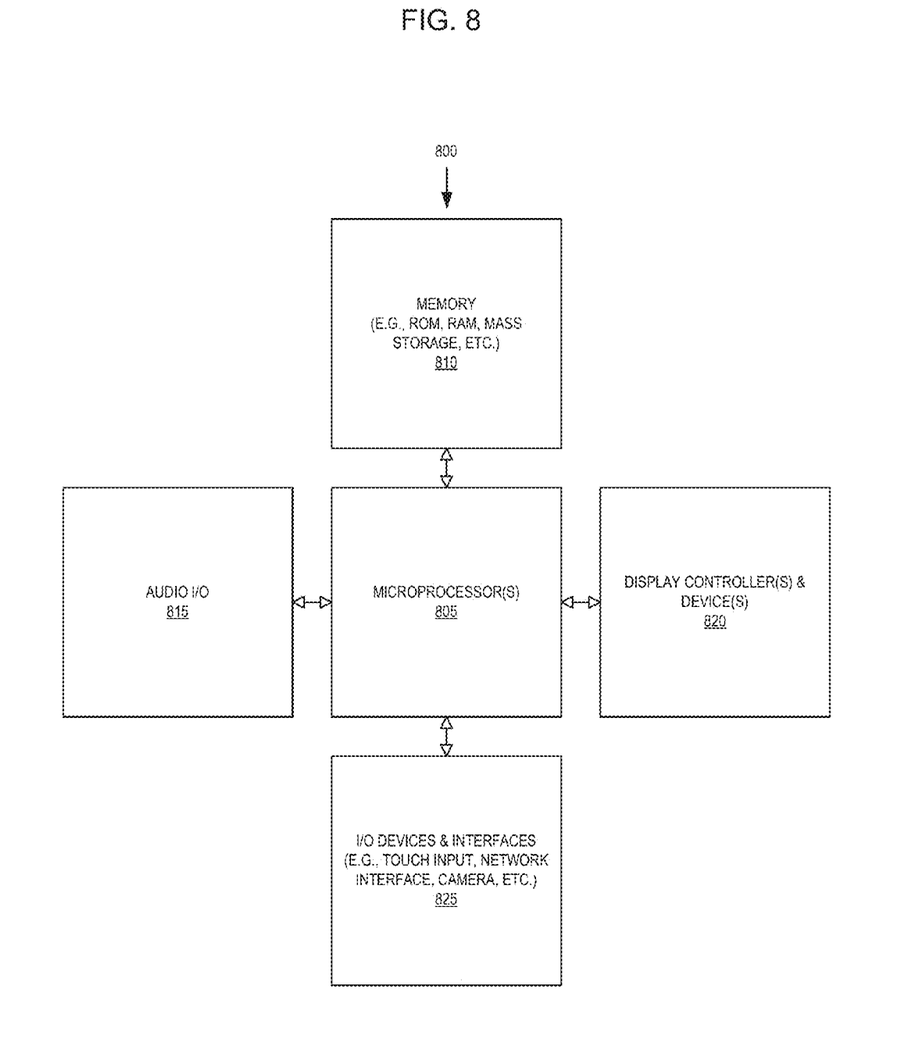
FIG. 8 illustrates a block diagram for an exemplary processing system to provide social network functionalities according to an embodiment of the invention.

FIG. 8 illustrates, in block diagram form, an exemplary data processing system 800 to provide social networking functionalities. Data processing system 800 includes one or more microprocessors 805 and connected system components (e.g., multiple connected chips). Alternatively, the data processing system 800 is a system on a chip.

The data processing system 800 includes memory 810, which is coupled to the microprocessor(s) 805. The memory 810 may be used for storing data, metadata, and programs for execution by the microprocessor(s) 805. The memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 810 may be internal or distributed memory.

The data processing system 800 also includes an audio input/output subsystem 815 which may include a microphone and/or a speaker for, for example, playing back music or other audio, receiving voice instructions to be executed by the microprocessor(s) 805, playing audio notifications, etc.

A display controller and display device 820 provides a visual user interface for the user, e.g., GUI windows.

The data processing system 800 also includes one or more input or output ("I/O") devices and interfaces 825, which are provided to allow a user to provide input to, receive output from, and otherwise transfer data to and from the system. These I/O devices 825 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 800.

The I/O devices and interfaces 825 may also include a connector for a dock or a connector for a USB interface, FireWire, Thunderbolt, Ethernet, etc. to connect the system 800 with another device, external component, or a network. Exemplary I/O devices and interfaces 825 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 800 with another device, external component, or a network and receive stored instructions, data, tokens, etc.

It will be appreciated that one or more buses may be used to interconnect the various components shown in FIG. 8.

The data processing system 800 is an exemplary representation of a client device 110, but any of these features may also be utilized by one or more devices implementing the social networking system 100. The data processing system 800 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 800 may be a network computer, server, or an embedded processing device within another device or consumer electronic product. As used herein, the terms computer, system, device, processing device, and "apparatus comprising a processing device" may be used interchangeably with the data processing system 800 and include the above-listed exemplary embodiments.

It will be appreciated that additional components, not shown, may also be part of the system 800, and, in certain embodiments, fewer components than that shown in FIG. 8 may also be used in a data processing system 800. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 810 or other non-transitory machine-readable storage medium. The software may further be transmitted or received over a network (not shown) via a network interface device 825. In various embodiments, hardwired circuitry may be used in combination with the software instructions to implement the present embodiments. Thus, the techniques are not limited to any specific combination of hardware circuitry and software, or to any particular source for the instructions executed by the data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method comprising:

maintaining, by a set of one or more computing devices, one or more data stores storing a social graph comprising a plurality of nodes and a plurality of edges between the nodes, wherein the plurality of nodes includes user nodes corresponding to users of a social networking system and concept nodes corresponding to concepts, and wherein user attributes are associated with each user node;

identifying an unknown, incomplete, or inaccurate user attribute that is to be inferred for a user of the social networking system;

generating a plurality of probability lists using a corresponding plurality of probability algorithms that each utilize one or more known user attributes of the user and the social graph, wherein each probability list of the plurality of probability lists includes a set of one or more probability entries that each include a prediction value and a confidence score corresponding to the prediction value, wherein the prediction value is a possible value of the unknown, incomplete, or inaccurate user attribute, and wherein the confidence score is a value indicating a predicted likelihood that the prediction value is a correct value of the unknown, incomplete, or inaccurate user attribute;

generating an inferred user attribute value based upon the plurality of probability lists and a plurality of weights corresponding to the plurality of probability algorithms, wherein each weight of the plurality of weights indicates a relative confidence that the corresponding probability algorithm will generate a probability list including a prediction value that is the correct value of the unknown, incomplete, or inaccurate user attribute; and storing the inferred user attribute value in the one or more data stores.

2. The method of claim 1, wherein a first probability list of the plurality of probability lists is generated using a set of one or more known user attributes of the user.

3. The method of claim 2, wherein the first probability list is further generated based upon a set of one or more concept nodes that are connected to a user node of the social graph representing the user through a set of edges.

4. The method of claim 1, wherein a first probability list of the plurality of probability lists is generated based upon known user attributes from a set of user nodes of the social graph that are connected to the user node through a set of edges.

5. The method of claim 4, wherein the first probability list is further generated based upon a set of concept nodes of the social graph that are connected to the set of user nodes through a second set of edges.

6. The method of claim 1, further comprising:
receiving an indication of the correct value of the unknown, incomplete, or inaccurate user attribute; and
responsive to said receiving of the indication of the correct value, adjusting at least one weight of the plurality of weights to change the relative confidence of the corresponding probability algorithm.

7. The method of claim 1, further comprising:
receiving, from a second user of the social networking system, a search query including a first search term, wherein the first search term is related to the inferred user attribute value;
responsive to said receiving of the search query, generating a set of search results for the search query using the one or more data stores, wherein the set of search results includes information related to the user because the generated inferred user attribute value for the user is related to the first search term; and
presenting the set of search results to the second user.

8. The method of claim 1, further comprising:
presenting, to the user, a user interface that solicits confirmation from the user that the generated inferred user attribute value is the correct value of the unknown, incomplete, or inaccurate user attribute.

9. The method of claim 1, further comprising:
presenting, to the user, a recommendation message that is configured to be presented to users of the social networking system having a user attribute matching the generated inferred user attribute.

10. The method of claim 9, wherein the recommendation message is an advertisement.

11. A set of one or more computer-readable non-transitory storage media that provides instructions that, when executed by a set of one or more processing devices, will cause said set of processing devices to perform operations comprising:
maintaining one or more data stores storing a social graph of a social networking system comprising a plurality of nodes and a plurality of edges between the nodes, wherein the plurality of nodes includes user nodes corresponding to users of the social networking system and concept nodes corresponding to concepts, and wherein user attributes are associated with each user node;

identifying an unknown, incomplete, or inaccurate user attribute to be inferred for a user of the social networking system;

generating a plurality of probability lists using a corresponding plurality of probability algorithms that utilize a set of known user attributes of the user and the social graph, wherein each probability list of the plurality of probability lists includes a set of one or more probability entries that each include a prediction value and a confidence score corresponding to the prediction value, wherein the prediction value is a possible value of the unknown, incomplete, or inaccurate user attribute, and wherein the confidence score is a value indicating a predicted likelihood that the prediction value is a correct value of the unknown, incomplete, or inaccurate user attribute;

generating an inferred user attribute value based upon the plurality of probability lists and a plurality of weights corresponding to the plurality of probability algorithms, wherein each weight of the plurality of weights indicates a relative confidence that the corresponding probability algorithm will generate a probability list including a prediction value that is the correct value of the unknown, incomplete, or inaccurate user attribute; and storing the inferred user attribute value in the one or more data stores.

12. The set of computer-readable non-transitory storage media of claim 11, wherein a first probability list of the plurality of probability lists is generated using a set of one or more known user attributes of the user.

13. The set of computer-readable non-transitory storage media of claim 12, wherein the first probability list is further generated based upon a set of one or more concept nodes that are connected to a user node of the social graph representing the user through a set of edges.

14. The set of computer-readable non-transitory storage media of claim 11, wherein a first probability list of the plurality of probability lists is generated based upon known user attributes from a set of user nodes of the social graph that are connected to the user node through a set of edges.

15. The set of computer-readable non-transitory storage media of claim 14, wherein the first probability list is further generated based upon a set of concept nodes of the social graph that are connected to the set of user nodes through a second set of edges.

16. The set of computer-readable non-transitory storage media of claim 11, wherein the operations further comprise:
receiving an indication of the correct value of the unknown, incomplete, or inaccurate user attribute; and
responsive to said receiving of the indication of the correct value, adjusting at least one weight of the plurality of weights to change the relative confidence of the corresponding probability algorithm.

17. The set of computer-readable non-transitory storage media of claim 11, wherein the operations further comprise:
receiving, from a second user of the social networking system, a search query including a first search term, wherein the first search term is related to the inferred user attribute value;
responsive to said receiving of the search query, generating a set of search results for the search query using the one or more data stores, wherein the set of search results includes information related to the user because the generated inferred user attribute value for the user is related to the first search term; and presenting the set of search results to the second user.

18. The set of computer-readable non-transitory storage media of claim 11, wherein the operations further comprise:
presenting, to the user, a user interface that solicits confirmation from the user that the generated inferred user attribute value is the correct value of the unknown, incomplete, or inaccurate user attribute.

19. The set of computer-readable non-transitory storage media of claim 11, wherein the operations further comprise:
presenting, to the user, a recommendation message that is configured to be presented to users of the social networking system having a user attribute matching the generated inferred user attribute.

20. The set of computer-readable non-transitory storage media of claim 19, wherein the recommendation message is an advertisement.

* * * * *